July 22, 1958  H. HESSE  2,844,035
MEANS FOR PREVENTING THE DARKENING OF GLASS
TUBES BY THE ACTION OF MERCURY
Filed Oct. 6, 1954
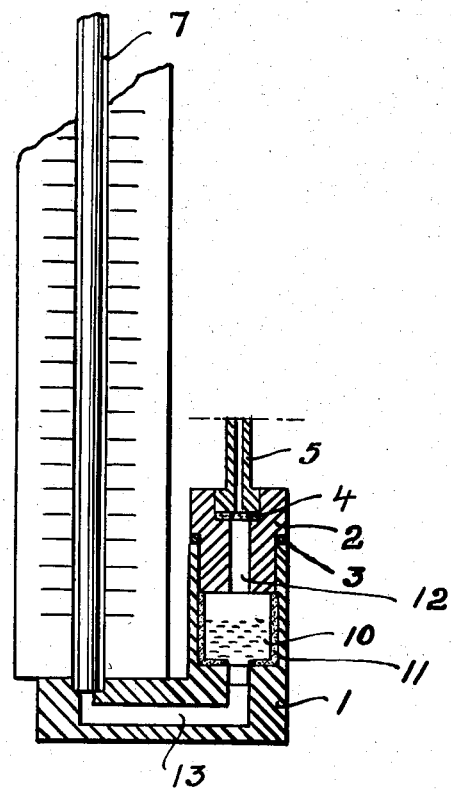

2,844,035

MEANS FOR PREVENTING THE DARKENING OF GLASS TUBES BY THE ACTION OF MERCURY

Holger Hesse, Vedbaek, Denmark

Application October 6, 1954, Serial No. 460,651

Claims priority, application Germany October 19, 1953

1 Claim. (Cl. 73—401)

This invention relates to methods for preventing the darkening of glass tubes by the action of mercury.

It is generally known that glass tubes through which mercury is flowing tend to become dark or black. This is probably due to the fact that very small mercury particles separate from the main body of the mercury flow, especially when the tube is shaken, as for instance during transportation, and then do not combine again with the main mercury body for reasons that have not been fully investigated up to now. These small mercury particles are then adsorbed by the inner walls of the glass tubes, particularly where the latter are not quite smooth, and thus gradually bring about a darkening of the tube. Sometimes also the mercury itself may be tarnished in this manner.

This phenomenon is particularly disturbing when occurring in measuring apparatus for chemical, physical, and medicinal purposes, and I have found that it may be counter-acted in the following way: In one portion of the apparatus where the mercury is passing through but which is itself not essential for the observation of the mercury column there is provided a material having a pronounced tendency to adsorb the mercury particles. According to a particularly advantageous embodiment of the invention, a portion of the inner tube walls—at a point where the latter need not be transparent for observation purposes—is coated with a substance capable of adsorbing the mercury particles. Such substances are adhesives of a glue, resin or rubber or the like base. In this manner the mercury particles are wholly or almost wholly adsorbed in the adhesive-coated portions of the tube. The other parts of the tube walls, especially those that are essential for observing the mercury column, will then remain clear and transparent, and a tarnishing of the mercury body, too, is avoided in this manner.

As a rule it is sufficient to provide only a very thin layer of adhesive in the aforesaid portions of the tube walls, which leaves the inner volume of the tubes practically unaltered.

The invention is further illustrated by the embodiment of the attached drawing, which should be considered as an example only.

The drawing shows a mercury manometer for measuring blood pressures. The manometer housing 1 encloses a mercury storage container 10 with a lid 2, a tight sealing between said container and said lid being provided by a packing ring 3 arranged between them. In the lid 2 there is provided an air conduit 5 of which one end, i. e. the end facing a channel 12 provided in the lid 2 and leading to the storage container, is covered by a leather membrane 4. From the storage container a channel 13 in the housing leads to the manometer tube 7 which consists of glass and has a measuring scale arranged behind it.

As will be seen from the drawing, the walls of the storage container 10 are coated with a layer of adhesive material 11. The small mercury particles which have separated from the main mercury body are adsorbed by this layer and will thus not settle on the other walls, especially those of the glass tube 7, along which the mercury stream is passing.

If desired the walls of the channel 13 may wholly or partially be coated with the adhesive 11 in addition to the walls of the storage container.

I have found it particularly advantageous to coat with said adhesive from about 20% to about 40% of the total wall area along which the mercury stream is passing.

What I claim is:

In a measuring device including a quantity of mercury in a closed container having first and second portions, only the first of which is exposed for visual observation, the quantity of mercury passing through the apparatus to occupy different levels in the first portion which is exposed for visual observation and thus indicates the value of a quantity to be measured; the interior of said second portion being coated with an adhesive substance selected from the group consisting of glue, resin and rubber, the coating covering at least a part of the container walls along which the mercury passes and being limited to said second portion and the mercury contacting surface of said second portion being tacky.

References Cited in the file of this patent

UNITED STATES PATENTS

| | | |
|---|---|---|
| 2,462,820 | Wallace | Feb. 22, 1949 |
| 2,466,743 | Schechter et al. | Apr. 12, 1949 |